United States Patent Office 3,636,157
Patented Jan. 18, 1972

3,636,157
PREPARATION OF TOLUALDEHYDES
John E. Bozik, Plum Borough, and Harold E. Swift, Gibsonia, Pa., assignors to Gulf Research & Development Company, Pittsburgh, Pa.
No Drawing. Filed Jan. 9, 1970, Ser. No. 1,872
Int. Cl. C07c 47/52
U.S. Cl. 260—599
10 Claims

ABSTRACT OF THE DISCLOSURE

Tolualdehydes are prepared by converting crotonaldehyde over a catalyst comprised of at least one Group I$b$ metal and at least one metal selected from the group consisting of tin and lead.

---

This invention relates to the conversion of crotonaldehyde to tolualdehyde over a catalyst comprised of at least one Group I$b$ metal and at least one metal selected from the group consisting of tin and lead.

Catalytic processes have been employed in the past to condense aldehydes. Among the catalysts utilized for the condensation of alkanaldehydes to unsaturated aldehydes are combinations of copper and tin salts. However, although unsaturated aldehydes can be prepared in this manner, aromatic aldehydes, the result of condensation and then cyclization, were not observed. When aromatic aldehydes, specifically tolualdehydes, were desired from crotonaldehyde, the crotonaldehyde has been condensed over a number of catalysts, primarily, the hydroxides of alkali metals potassium, rubidium, and cesium, and the oxides of the alkaline earth metals magnesium, barium and calcium. Furthermore, ferric oxide, calcium aluminates, and mixed oxides of iron and aluminum have also been used.

In view of this art, one would tend to use oxygenated alkali and alkaline earth metals if he wished to effectuate the catalytic condensation of crotonaldehyde to tolualdehyde and would avoid employing any copper and tin or related metal catalysts since these catalysts appear to be only effective for condensing saturated aldehydes to unsaturated aldehydes, one of which can be crotonaldehyde. Consequently, it is doubly surprising and unexpected that a copper and tin or related metals catalyst will catalyze the conversion of crotonaldehyde to tolualdehyde.

In accordance with the present invention, a process is provide for the conversion of crotonaldehyde to tolualdehyde comprising contacting crotonaldehyde with a catalyst comprised of at least one Group I$b$ metal and at least one metal selected from the group consisting of tin and lead with the Group I$b$ metal content to the tin and/or lead metal content being within a molar ratio of about 5:1 to about 1:4 at a temperature of from about 150 to about 375° C. and a liquid hourly space velocity of from about 0.2 to about 2.0.

The catalyst of this invention is comprised of at least one metal selected from Group I$b$, that is, copper, silver and gold, and at least one metal selected from the group consisting of tin and lead. The catalyst is preferably a solid at conversion conditions. As used in this application and claims, the metal can be in its combined state such as an oxide, an inorganic salt, an organic salt, or an organometallic; the metal in its uncombined elemental state; the metal in its alloyed state; or a mixture of any of these states. The inorganic salts which can be employed include nitrate, carbonate, sulfate, phosphate, halide, sulfide, etc. Organic salts which are utilizable include acetate, acetylacetonate, tartrate, oxalate, etc. Organometallics include tetravinyltin, tetraphenyltin, tetramethoxide, tetraphenyllead, etc. The term "alloy" is used herein in its broad general state, that is, to include intermetallic compounds, solid solutions of the metals or mixtures thereof in crystalline or amorphous phases, or mixtures thereof. Preferably a substantial portion of the metals is in its alloyed state. The metals can be in any combination desired, for example, silver and tin; silver and lead; gold and tin; gold, silver and lead; copper and lead; etc. The preferred combination of metals is copper and tin.

The molecular ratio of Group I$b$ metals to tin and lead must be within a range of from about 5:1 to about 1:4. A more preferred molar ratio is from about 2:1 to about 1:2. Above a 5:1 molar ratio, the crotonaldehyde has an increasing tendency to be converted to n-butyraldehyde under the process condition rather than to aromatics. If the process is carried out with a metals molar ratio of less than 1:4, conversion is significantly reduced.

Although the catalyst can be employed in an unsupported form, it is preferable to disperse the metals in and/or on a conventional support such as alumina, zeolites, pumice, kieselguhr, silica, etc. A non-acidic support material, acidity determined by ammonia absorption is preferred. Of these types of support materials, silica is most preferable. When the supported catalyst is employed in this invention, a preferred metals concentration calculated as the elemental metal and exclusive of support material metals is from about 5 to about 50 weight percent of the total catalyst weight. The total catalyst is the sum of all the components including the support material. If the metal concentration is below about 5 weight percent, conversion is significantly decreased. Further addition of metals above about 50 weight percent is not advantageous. A more preferred range of metals concentration is from about 10 to about 40 weight percent of the total catalyst.

The catalyst of this invention can be conveniently prepared in any conventional manner. In order to prepare the unsupported catalyst, thermal decomposition of appropriate materials such as SnCl$_2$·2H$_2$O, CuCO$_3$, Sn[OC$_3$H$_7$]$_4$, Cu$_2$Cl$_2$, Cu[C$_5$H$_7$O$_2$]$_2$·H$_2$O, AgNO$_3$ Pb(NO$_3$)$_2$, etc. can be used. Other available methods include co-precipitation or co-gellation of the proper salts. Still further, a mechanical mixture of salts, oxides, or salts and oxides with an inert binder can be used. When preparing the supported catalyst, an effective procedure is impregnating the support to incipient wetness with a proper salt solution. Other methods which can be employed are precipitation including co-precipitation and co-gellation of the metals on the preformed support or concurrently precipitating the metals and support material for instance. Pretreatment of the particular catalysts for the process of this invention is carried out by the standard methods well known to those of ordinary skill in the art.

In converting crotonaldehyde to tolualdehyde according to this invention, it is preferable to use an inert diluent with the feedstock. Suitable diluents include the rare gases such as helium, neon, etc.; nitrogen; and hydrogen. Of these inert diluents, hydrogen is preferred. When an inert diluent is used, it is present in a molar ratio of from about 10:1 to about 1:2 inert diluent to crotonaldehyde. Above a molar ratio of about 10:1, insufficient quantities of crotonaldehyde are converted. Below a molar ratio of about 1:2, no particular advantages are observed. A preferred molar ratio of inert diluent is from about 1:1 to about 5:1.

The temperature at which the condensation of this invention occurs is from about 150° to about 375° C. Below about 150° C. the conversion of crotonaldehyde is significantly lowered. If the process is carried out above 375° C., selectivities are significantly altered. A more preferred temperature range is from about 200 to about 300° C.

The crotonaldehyde should be passed over the catalyst at a liquid hourly space velocity (LHSV) of from about 0.2 to about 2.0. Below about 0.2, contact time is too lengthy and further reactions can occur. Above about 2.0, conversion is significantly reduced. A more preferred liquid hourly space velocity range is from about 0.35 to about 0.50.

Although pressure is not a significant variable in this process and atmospheric pressure is desirable, it is preferable to keep the pressure below about three atmospheres.

In order to point our more fully the nature of the present invention, the following specific examples are set forth without any intention of limiting the invention.

EXAMPLE 1

The catalysts used in Examples 2–5 were prepared by impregnating a Davison Grade 70 silica gel with an aqueous solution of cupric nitrate and stannic chloride $$(SnCl_4 \cdot 5H_2O)$$

containing the proper amount of each salt to give the desired Cu:Sn molar ratio and total metal concentration.

The catalysts were dried at 120° C. and calcined 16 hours in air at 500° C. 15 cc. of the catalyst was charged to a Pyrex glass reactor and reduced with hydrogen at a temperature of 375° C. for 20 hours. The flow rate of hydrogen was adjusted to 40 cc./min., liquid crotonaldehyde was introduced into the hydrogen carrier gas stream and the process continued under the conditions of Examples 2–5.

After two hours, the accumulated product was analyzed by gas chromatography and the results are summarized in Tables I–IV below. Products other than aromatics included n-butyraldehyde, n-butanol and gases.

EXAMPLE 2

Several catalysts having various Cu:Sn molar ratios but a constant total metal content of 20 weight percent were evaluated at a temperature of 250° C. and a liquid hourly space velocity of 1.0. The results are summarized in the following table:

TABLE I

| Run No. | Cu:Sn mole ratio | Conversion, mole percent | Selectivity to aromatic compounds, mole percent of converted crotonaldehyde ||||| 
|---|---|---|---|---|---|---|---|
| | | | Benzene | o-Xylene | Benz-aldehyde | o-Tolu-aldehyde | p-Tolu-aldehyde |
| 1 | 5:1 | 21.4 | 13.6 | 2.3 | 22.7 | 11.4 | 4.5 |
| 2 | 3:1 | 21.2 | 17.3 | 2.5 | 22.9 | 14.8 | 4.9 |
| 3 | 2:1 | 30.2 | 11.0 | 1.8 | 22.0 | 29.4 | 7.3 |
| 4 | 1:1 | 37.2 | 8.6 | 2.9 | 18.6 | 34.3 | 7.1 |
| 5 | 1:2 | 35.5 | 9.0 | 1.5 | 20.9 | 28.4 | 7.5 |

These experiments demonstrate the effect of the molar ratio of the Group Ib metals to tin and lead on the conversion and selectivity of the process.

EXAMPLE 3

A catalyst having a Cu:Sn molar ratio of 1:1 and a total metal content of 20 weight percent was evaluated at a temperature of 250° C. and various liquid hour space velocities. The results are summarized in the following table:

TABLE II

| Run No. | LHSV, hr.⁻¹ | Conversion, mole percent | Selectivity to aromatics, mole percent of converted crotonaldehyde |||||
|---|---|---|---|---|---|---|---|
| | | | Benzene | o-Xylene | Benz-aldehyde | o-Tolu-aldehyde | p-Tolu-aldehyde |
| 6 | 0.2 | 68.4 | 3.8 | 5.8 | 1.9 | 30.8 | 3.8 |
| 7 | 0.35 | 57.1 | 8.3 | 6.7 | 5.3 | 46.7 | 6.7 |
| 8 | 0.5 | 58.0 | 5.8 | 3.8 | 5.8 | 36.5 | 5.8 |
| 9 | 1.0 | 37.2 | 8.6 | 2.9 | 18.6 | 34.3 | 7.1 |
| 10 | 2.0 | 25.5 | 12.8 | 3.4 | 25.5 | 21.3 | 6.4 |

These results illustrate the operability of the entire liquid hourly space velocity range and the higher yields of tolualdehyde within the 0.35–0.5 range.

EXAMPLE 4

A catalyst having a Cu:Sn molar ratio of 1:1 and a total metal content of 20 weight percent was evaluated at various temperatures using a liquid hourly space velocity of 0.5. The results are summarized in the following table:

TABLE III

| Run No. | Temp. ° C. | Conversion, mole percent | Selectivity to aromatic, mole percent of converted crotonaldehyde |||||
|---|---|---|---|---|---|---|---|
| | | | Benzene | o-Xylene | Benz-aldehyde | o-Tolu-aldehyde | p-Tolu-aldehyde |
| 11 | 200 | 34.0 | 2.9 | 2.9 | 17.4 | 11.6 | 4.3 |
| 12 | 225 | 40.0 | 4.5 | 2.7 | 13.5 | 21.6 | 5.4 |
| 13 | 250 | 58.0 | 5.8 | 3.8 | 5.8 | 36.5 | 5.8 |
| 14 | 275 | 63.0 | 5.2 | 5.2 | 5.2 | 31.0 | 5.2 |
| 15 | 300 | 75.9 | 7.0 | 18.3 | 2.8 | 25.4 | 4.2 |

These results demonstrate the effect of temperature on the inventive process.

EXAMPLE 5

Several catalysts having various total metal contents but a constant Cu:Sn molar ratio of 1:1 were evaluated at a temperature of 250° C. and a liquid hourly space velocity of 0.5. The results are summarized in the following table.

TABLE IV

| Run No. | Weight percent total metal | Conversion, mole percent | Selectivity to aromatic, mole percent of converted crotonaldehyde | | | | |
|---|---|---|---|---|---|---|---|
| | | | Benzene | o-Xylene | Benzaldehyde | o-Tolualdehyde | p-Tolualdehyde |
| 16 | 5 | 42.3 | 13.5 | 2.7 | 10.8 | 27.0 | 5.4 |
| 17 | 10 | 61.7 | 12.4 | 3.5 | 5.3 | 30.1 | 5.3 |
| 18 | 20 | 58.0 | 5.8 | 3.8 | 5.8 | 26.5 | 5.8 |
| 19 | 30 | 50.6 | 13.2 | 3.3 | 6.6 | 28.6 | 4.4 |
| 20 | 40 | 44.3 | 14.8 | 4.9 | 7.4 | 34.6 | 3.7 |

The results demonstrate the desirable yields within the metal concentration ranges and the tendency to undesirable yields outside these ranges.

EXAMPLE 6

A 30 weight percent copper on silica catalyst was prepared by impregnating thhe Davison Grade 70 silica gel with an aqueous solution of cupric nitrate. The catalyst pretreatment and experimental procedure were the same for Example 1. Evaluation of the catalyst for crotonaldehyde condensation was carried out at 250° C. and a liquid hourly space velocity of 1.0. The results of the experiment were that tolualdehyde was not observed but crotonaldehyde was substantially hydrogenated to n-butyraldehyde.

EXAMPLE 7

A weight percent tin on silica was prepared by impregnating the Davison Grade 70 silica gel with an aqueous solution of stannous chloride and water. The catalyst pretreatment and experimental procedure were the same as for Example 1. Evaluation of the catalyst for crotonaldehyde condensation was carried out at 250° C. and a liquid hourly space velocity of 1.0. The results of the experiment were that no conversion of the crotonaldehyde was observed.

It is to be understood that the above disclosure is by way of specific example and that numerous modifications and variations in the alloy materials and methods for their preparation and utilization are available to those of ordinary skill in the art without departing from the true spirit and scope of our invention.

Whereupon we claim:

1. A process for preparing tolualdehydes comprising contacting crotonaldehyde with a catalyst comprised of at least one Group Ib metal and at least one metal selected from the group consisting of tin and lead with the Group Ib metal content to the tin and/or lead metal content being within a molar ratio of about 5:1 to about 1:4 at a temperature from about 150 to about 375° C. and a liquid hourly space velocity of from about 0.2 to about 2.0.

2. A process in accordance with claim 1 wherein the metals are copper and tin.

3. A process in accordance with claim 2 wherein the metals are dispersed on a support material and the metals are from about 5 to about 50 weight percent of the total catalyst weight.

4. A process in accordance with claim 3 wherein the support is silica.

5. A process in accordance with claim 4 wherein the molar ratio of the metals is between about 2:1 and 1:2 and the metals are from about 10 to about 40 weight percent of the total catalyst weight.

6. A process in accordance with claim 5 wherein the temperature is from about 200 to about 300° C. and the liquid hourly space velocity is from about 0.35 to about 0.5.

7. A process in accordance with claim 6 wherein hydrogen is a diluent.

8. A process in accordance with claim 7 wherein the hydrogen is present in a molar ratio of from about 1:1 to about 5:1 with respect to the crotonaldehyde.

9. A process in accordance with claim 1 wherein the catalyst is a solid at conversion conditions.

10. A process in accordance with claim 9 wherein a substantial portion of the metals is in its alloyed state.

References Cited

FOREIGN PATENTS 1,132,285   10/1956   France _____ 260—599
1,270,621   7/1961    France _____ 260—599

BERNARD HELFIN, Primary Examiner

U.S. Cl. X.R.

260—668 R, 601 R

UNITED STATES PATENT OFFICE
CERTIFICATE OF CORRECTION

Patent No. 3,636,157                    Dated   January 18, 1972

Inventor(s)   John E. Bozik and Harold E. Swift

It is certified that error appears in the above-identified patent and that said Letters Patent are hereby corrected as shown below:

Col. 1, line 49, "provide" should be --provided--;

Col. 2, line 14, "condition" should be --conditions--;

Col. 3, line 28, "our" should be --out--;

Col. 4, Table III, Run No. 12 under Benzene,
        "4.5" should be --5.4--;

Col. 5, line 38, "A weight percent" should read
        --A 10 weight percent--.

Signed and sealed this 1st day of August 1972.

(SEAL)
Attest:

EDWARD M. FLETCHER, JR.          ROBERT GOTTSCHALK
Attesting Officer                Commissioner of Patents